United States Patent
Kim et al.

(10) Patent No.: US 11,958,002 B2
(45) Date of Patent: Apr. 16, 2024

(54) [0001] PRE-COATING FILTER DEVICE

(71) Applicant: K-1ECOTECH CO., LTD., Seoul (KR)

(72) Inventors: Jong Hak Kim, Seoul (KR); Chang Hyoung Choi, Gyeonggi-do (KR); Sang Ho Sung, Gyeonggi-do (KR)

(73) Assignee: K-1ECOTECH CO., LTD., Seoul (KR)

( * ) Notice: Subject to any disclaimer, the term of this patent is extended or adjusted under 35 U.S.C. 154(b) by 449 days.

(21) Appl. No.: 17/421,660

(22) PCT Filed: Jun. 29, 2020

(86) PCT No.: PCT/KR2020/008445
§ 371 (c)(1),
(2) Date: Jul. 8, 2021

(87) PCT Pub. No.: WO2021/112358
PCT Pub. Date: Jun. 10, 2021

(65) Prior Publication Data
US 2022/0080337 A1    Mar. 17, 2022

(30) Foreign Application Priority Data

Dec. 3, 2019   (KR) .................. 10-2019-0158724
Jan. 9, 2020   (KR) .................. 10-2020-0002919

(51) Int. Cl.
*B01D 33/06*    (2006.01)
*B01D 33/46*    (2006.01)
(Continued)

(52) U.S. Cl.
CPC ............ *B01D 33/06* (2013.01); *B01D 33/46* (2013.01); *B01D 33/56* (2013.01); *B01D 33/60* (2013.01);
(Continued)

(58) Field of Classification Search
CPC ........ B01D 33/06; B01D 33/46; B01D 33/56; B01D 33/60; B01D 33/80;
(Continued)

(56) References Cited

FOREIGN PATENT DOCUMENTS

KR        200195185 Y1  *  9/2000
KR     20100002305 U   *  3/2010
(Continued)

*Primary Examiner* — Waqaas Ali
(74) *Attorney, Agent, or Firm* — IPLA P.A.

(57) ABSTRACT

A pre-coating filter device includes: a filtration tank comprising a raw water inlet through which raw water flows on one side, and a drain port at the bottom; a top cover coupled to the upper part of the filtration tank and comprising a coupling hole through the middle part; a purified water discharge pipe coupled to the coupling hole of the top cover; a purified water storage space unit coupled to the lower part of the top cover and located within the filtration tank, and comprising a communication pipe connected to the central part; a filter coupling plate body coupled to the lower part of the purified water storage space unit and comprising a plurality of coupling holes through; and a pre-coating filter coupled to the coupling hole of the filter coupling plate body.

9 Claims, 9 Drawing Sheets

(51) Int. Cl.
*B01D 33/56* (2006.01)
*B01D 33/60* (2006.01)
*B01D 33/80* (2006.01)

(52) U.S. Cl.
CPC ........ *B01D 33/80* (2013.01); *B01D 2201/301* (2013.01)

(58) Field of Classification Search
CPC .. B01D 2201/301; B01D 29/15; B01D 29/54; B01D 29/6438; B01D 29/74; B01D 2201/0446; B01D 37/02
See application file for complete search history.

(56) References Cited

FOREIGN PATENT DOCUMENTS

| | | | |
|---|---|---|---|
| KR | 20100037809 | | 4/2010 |
| KR | 20100116087 A | * | 10/2010 |
| KR | 101046880 | | 7/2011 |
| KR | 101471771 B1 | * | 6/2013 |

* cited by examiner

[0001] PRE-COATING FILTER DEVICE

BACKGROUND

The present invention is related to a pre-coating filter device, and more specifically, to the pre-coating filter device for returning the filtration performance to the original state by effectively detaching the filter media and foreign materials adhered to the filters with strong twisting rotational force during backwashing operation In general, water treatment methods for filtering foreign materials contained in the raw water are classified into biological treatment for removing organic matter by microorganisms, chemical treatment for removing heavy metals by using chemicals, and physical treatment for removing solids and contaminants by machines such as screen etc., according to the processing principles.

Here, the filtration process, which is one of physical treatments, introduces the raw water containing contaminants into a filtering apparatus so as to produce clean treated water by filtering contaminants with separate filter media or filter members.

In particular, the pre-coating filter device, which is one of physical filtration processes, performs filtration by a plurality of filters, in which it performs filtration using the filter media coated on the outside of the filter, and due to continuous filtration processes, the pores of the filter media are clogged and the filtration resistance increases so as to degrade the filtration performance.

Hence, after the filtration processes for a certain period, separate backwashing process is performed, and as prior arts for this, there are Korean Patent Registration No. 10-1056048 and Korean Patent Registration No. 10-1046880, where by injecting instantaneously the compressed air from a compressor(273) during backwashing process in order to apply an impact to a filter unit(250), the filter unit(253) flows up and down, and a plurality of filter units(253) are shaken in any direction by vibration so as to remove the coating material (C) adhered to the outside.

However, in the prior art mentioned above, in addition to shortening the life cycle of the filter device because the high pressure injection of the compressed air exerts an impact on the filter itself, there is a problem that the filter cloth is torn due to an instantaneous impact and the filter media flow in with the purified water.

SUMMARY OF THE INVENTION

The present invention provides, as a solution for the problems of the prior art, a pre-coating filter device which enhances the detaching effect of the filter media and foreign materials adhered to the outside of the pre-coating filter while keeping the filtration performance.

In order to solve the above problems, the present invention includes a filtration tank comprising a raw water inlet through which raw water flows on one side, and a drain port at the bottom; a top cover coupled to the upper part of the filtration tank and comprising a coupling hole through the middle part; a purified water discharge pipe coupled to the coupling hole of the top cover; a purified water storage space unit coupled to the lower part of the top cover and located within the filtration tank, and comprising a communication pipe connected to the central part; a filter coupling plate body coupled to the lower part of the purified water storage space unit and comprising a plurality of coupling holes through; and a pre-coating filter coupled to the coupling hole of the filter coupling plate body.

According to an embodiment of the present invention, a filter rotation unit may be further comprised for detaching foreign materials adhered to the pre-coating filter by applying a rotational force to the filter coupling plate body and shaking the pre-coating filter.

According to an embodiment of the present invention, the filter rotation unit is characterized in that the rotational force is applied to rotate the pre-coating filter forward and reverse.

According to an embodiment of the present invention, the filter rotation unit may comprise a rotational motor, an eccentric shaft including one side coupled to the driving shaft of the rotational motor and rotating integrally with it, a crank arm hinged to the other side of the eccentric shaft and moving in a straight line, and a core shaft flange including one side hinged to the other side of the crank arm and the other side coupled to the communication pipe of the purified water storage space unit so as to rotate the purified water storage space unit forward and reverse by a predetermined angle.

According to an embodiment of the present invention, it is preferable that the purified water storage space unit is rotated forward and reverse by an angle of 35~45".

According to an embodiment of the present invention, the pre-coating filter may comprise a filter cloth having a cylindrical shape with a hollow inside, open top, and blocked bottom, and an elastic body inserted and coupled to the inside of the filter cloth.

According to an embodiment of the present invention, the pre-coating filter may further comprise an outer cap formed through the central part so as to be fitted on the upper outside of the filter cloth and including an outer locking jaw at the lower outside to be fastened to the filter coupling plate body, and an inner cap formed through the central part and including an outer pressing protrusion on the outside to be fitted on the upper inside of the filter cloth and press the filter cloth between the outer cap and the inner cap.

According to an embodiment of the present invention, the filtration tank may further comprise a high-pressure injection unit on one side and a nozzle unit on the inner wall surface, where the high-pressure washing water or air is injected from the high-pressure injection unit to the pre-coating filter through the nozzle unit.

According to an embodiment of the present invention, a backwashing water supply unit may be further comprised in the purified water discharge pipe, where the backwashing water supply unit is characterized in that it serves to detach the filter media and foreign materials adhered to the outside of the filter cloth by supplying the high-pressure backwashing water to the inside of the filter cloth.

The present invention improves the filtration efficiency by the pre-coating filter of the cylindrical shape, as well as enhances the effect for detaching the filter media and foreign materials adhered to the outside of the pre-coating filter by the high-pressure backwashing water and the forward and reverse rotation of the filter rotation unit.

DETAILED DESCRIPTION OF THE INVENTION

Figure 1:
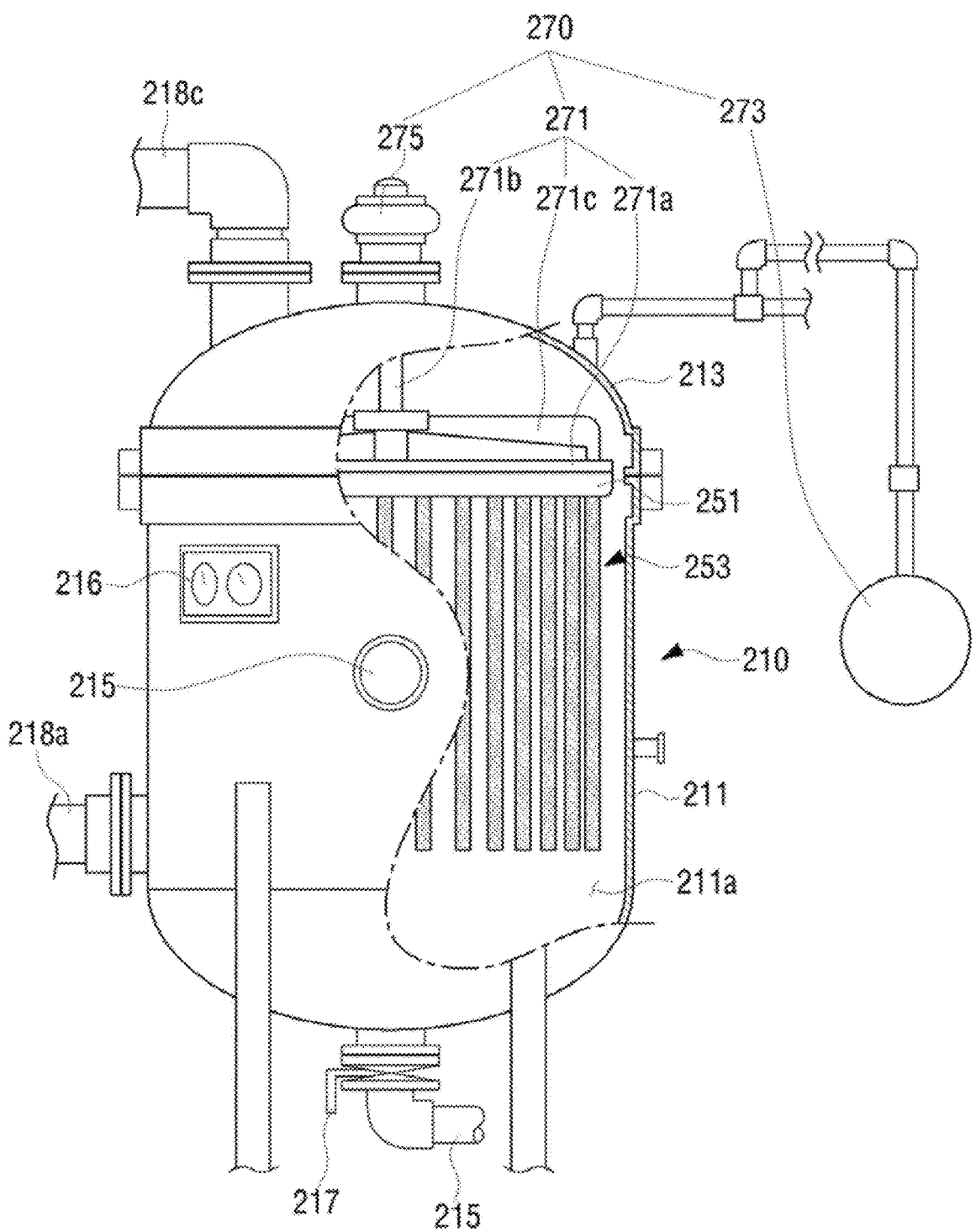
FIG. 1 shows a schematic representation of the prior art pre-coating filter device.
Figure 2:
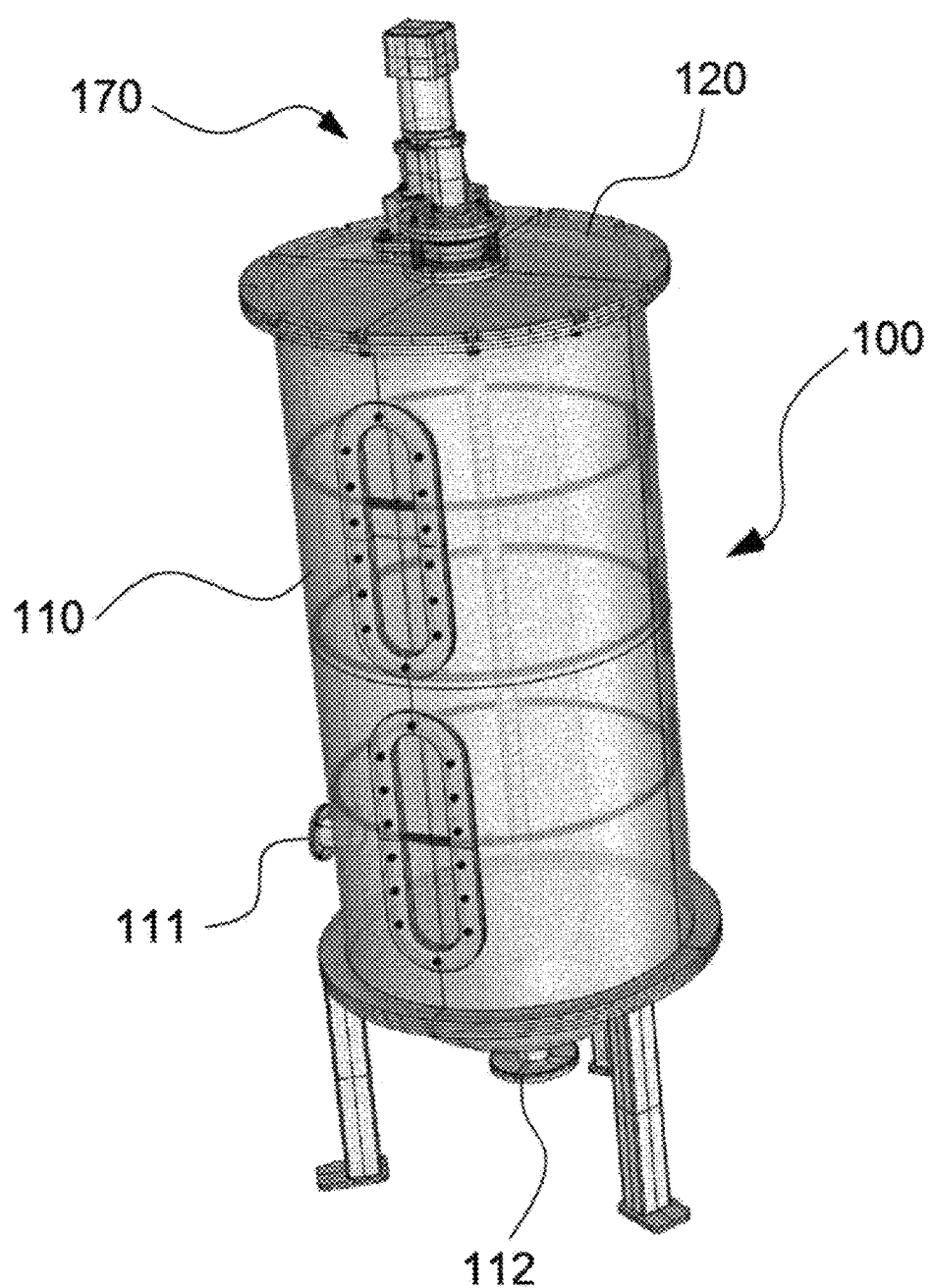
FIG. 2 shows a schematic representation of a pre-coating filter device in accordance with an embodiment of the invention.
Figure 3:
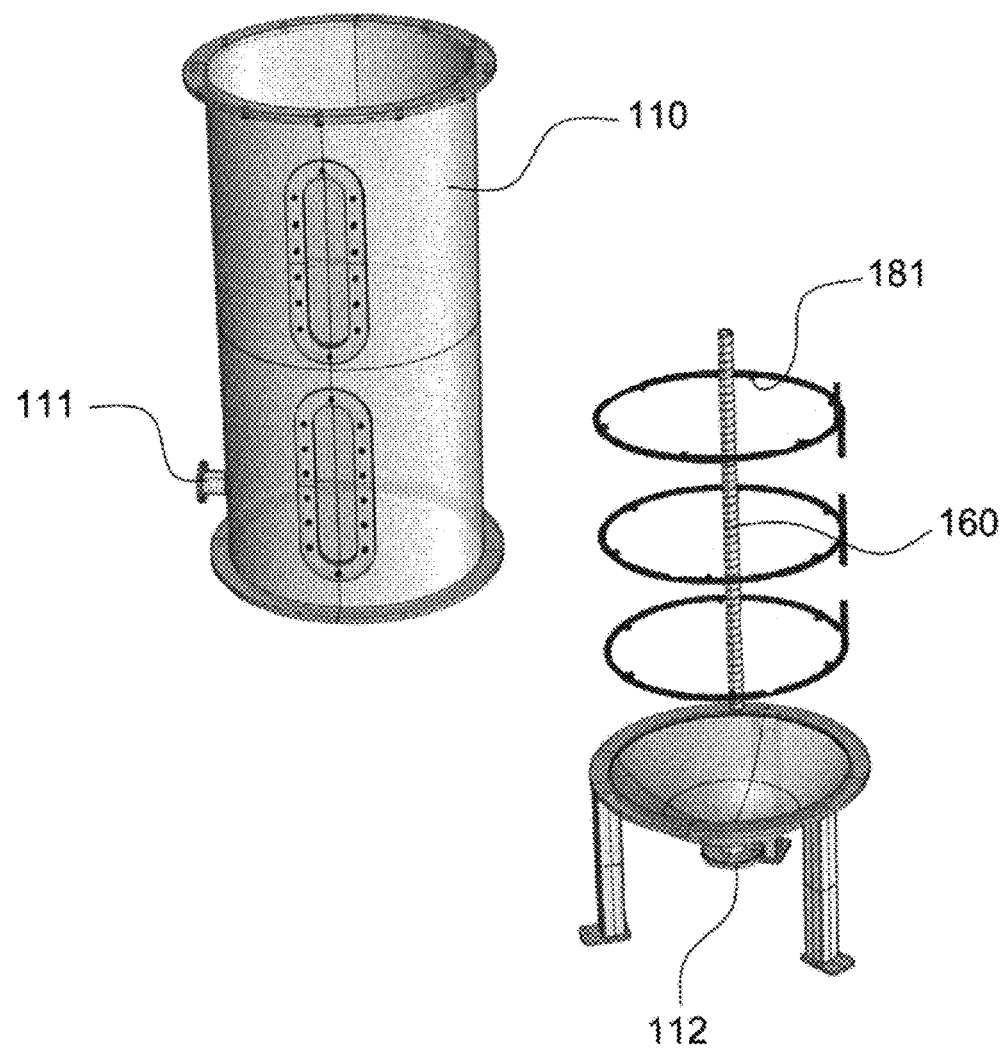
FIG. 3 shows the parts diagram inside the filtration tank of the pre-coating filter device in accordance with an embodiment of the invention.
Figure 4:
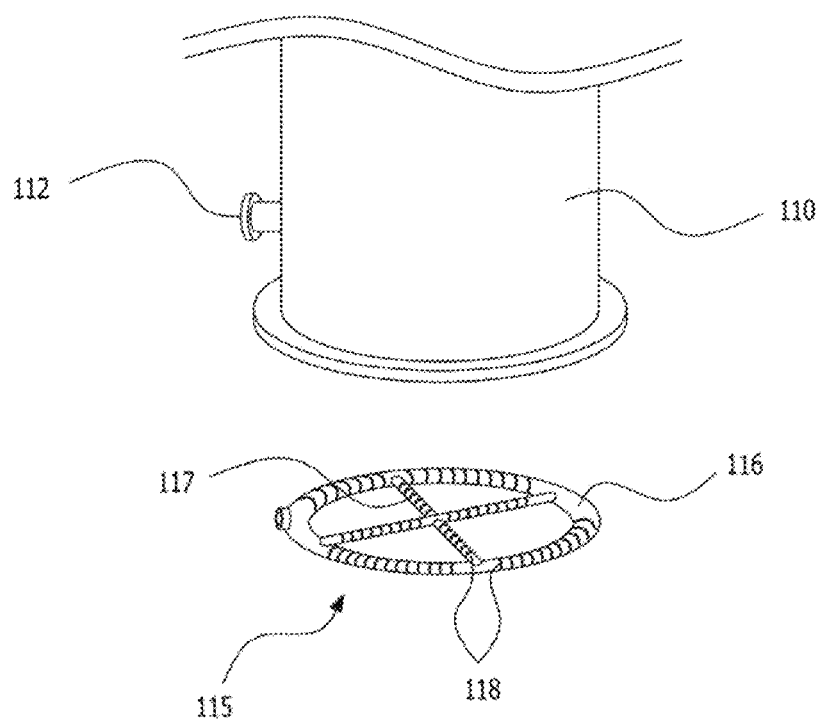
FIG. 4 shows the raw water passage part of the pre-coating filter device in accordance with an embodiment of the invention.
Figure 5:
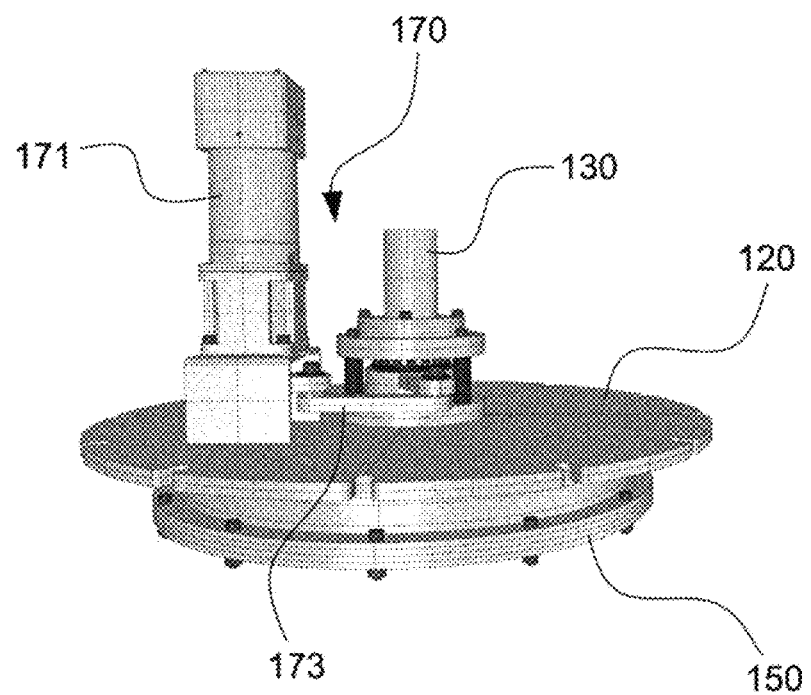
FIG. 5 and FIG. 6 show the drawings in which the upper side of the filtration tank is separated in the pre-coating filter device in accordance with an embodiment of the invention.
Figure 6:
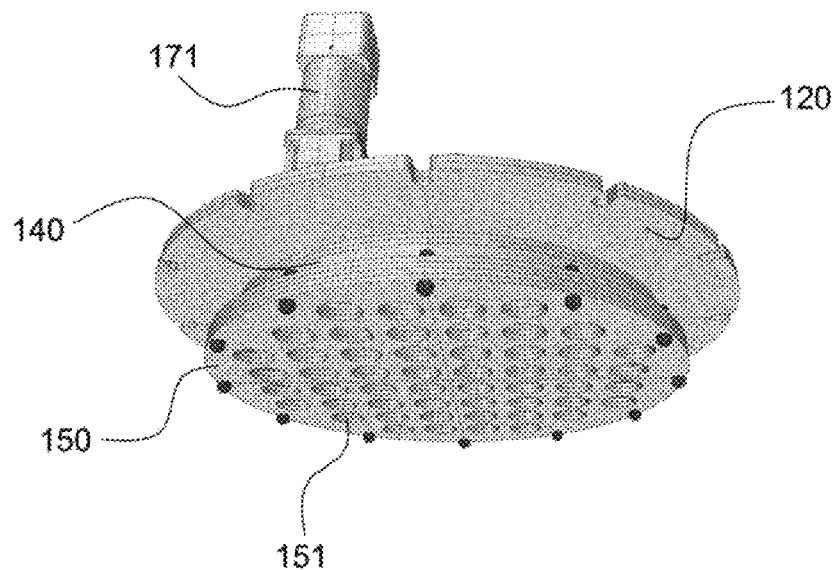
Figure 7:
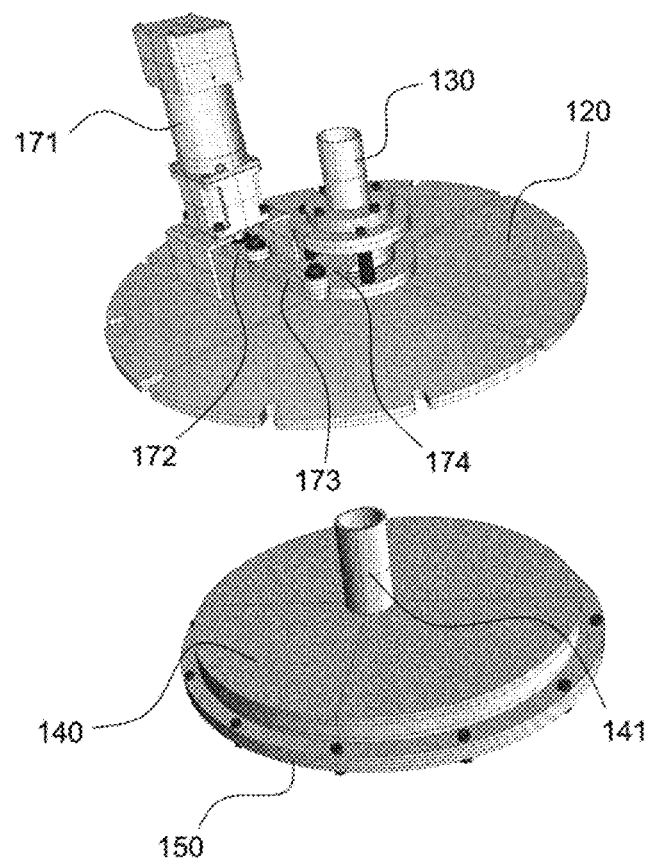
FIG. 7 and FIG. 8 show the drawings in which the top cover and the filter coupling plate body are separated in the pre-coating filter device in accordance with an embodiment of the invention.
Figure 8:
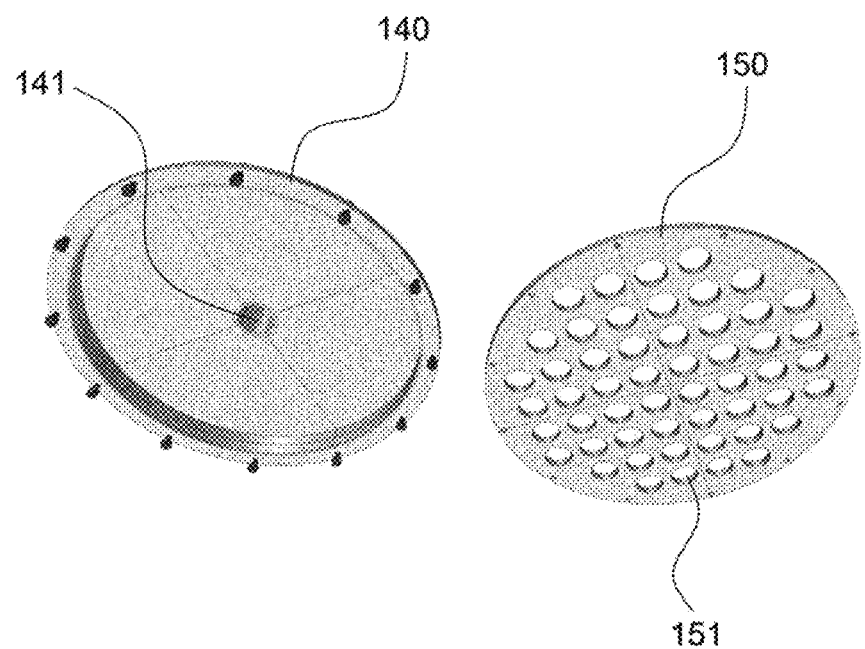
Figure 9:
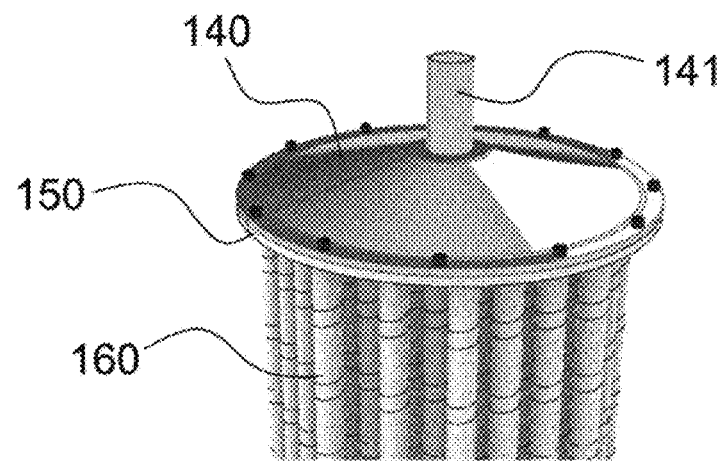
FIG. 9 and FIG. 11 show the drawings in which the pre-coating filter is coupled to the filter coupling plate body in the pre-coating filter device in accordance with an embodiment of the invention.
Figure 10:
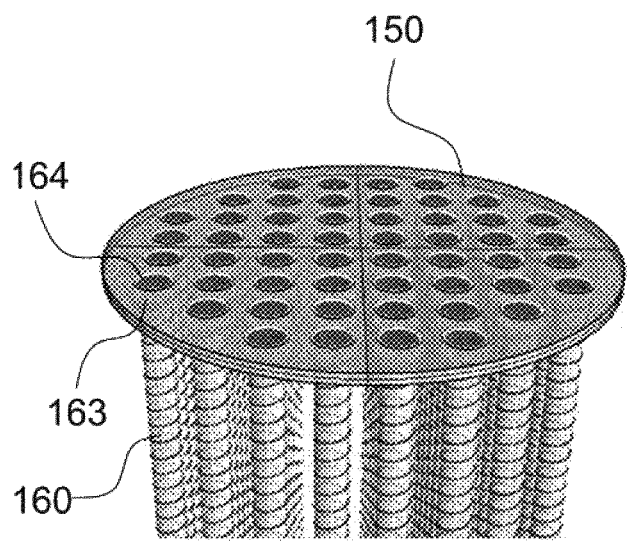
Figure 11:
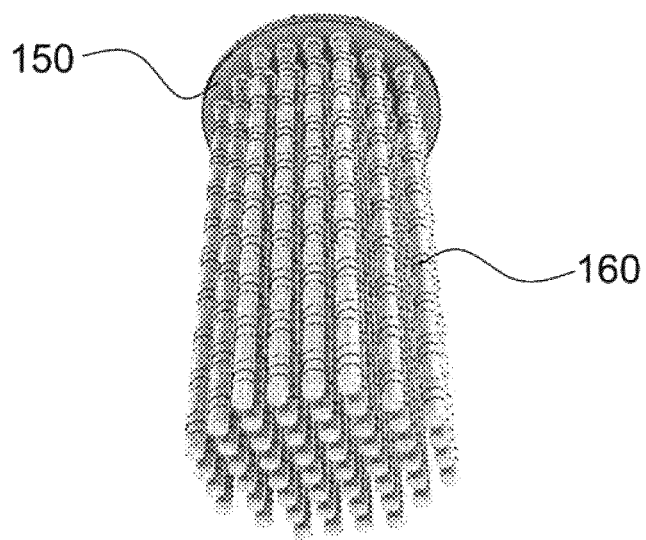
Figure 12:
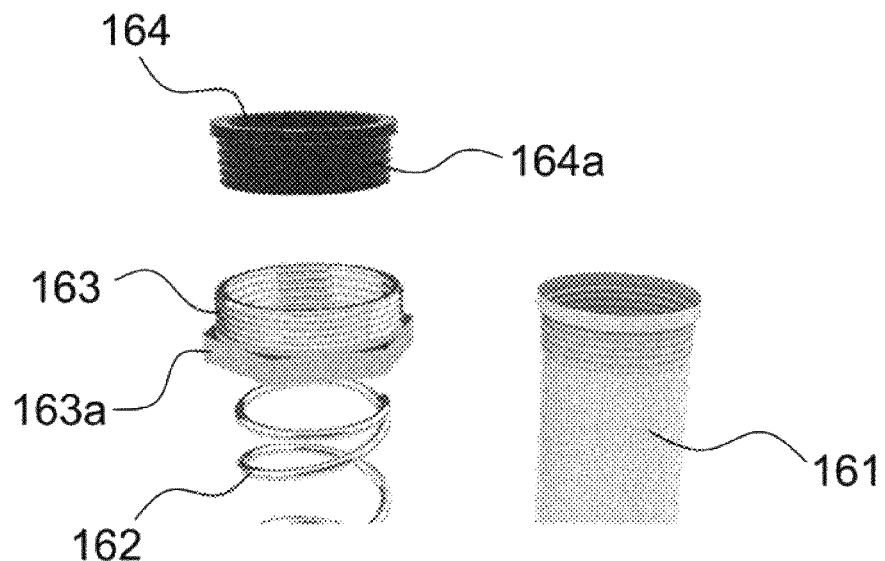
FIG. 12 shows the separated components of the pre-coating filter of the pre-coating filter device in accordance with an embodiment of the invention.
Figure 13:
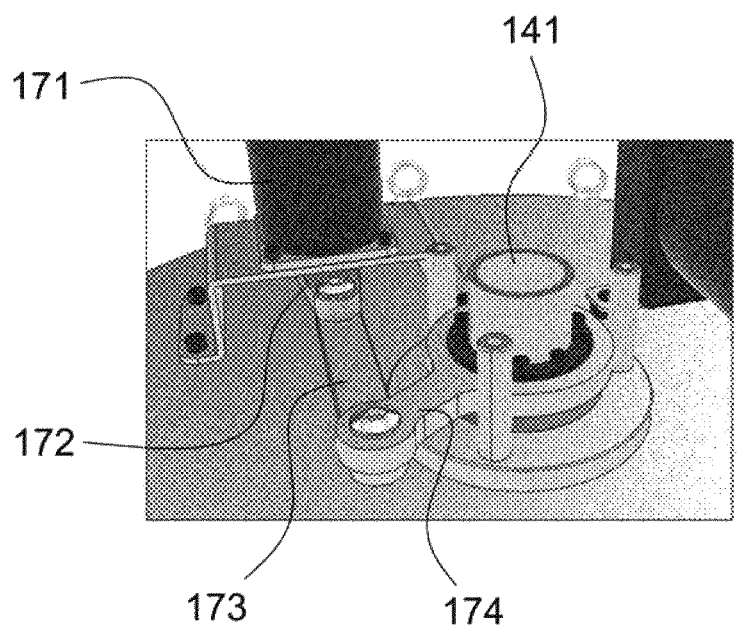
FIG. 13 shows the filter rotation unit of the pre-coating filter device in accordance with an embodiment of the invention.
Figure 14:
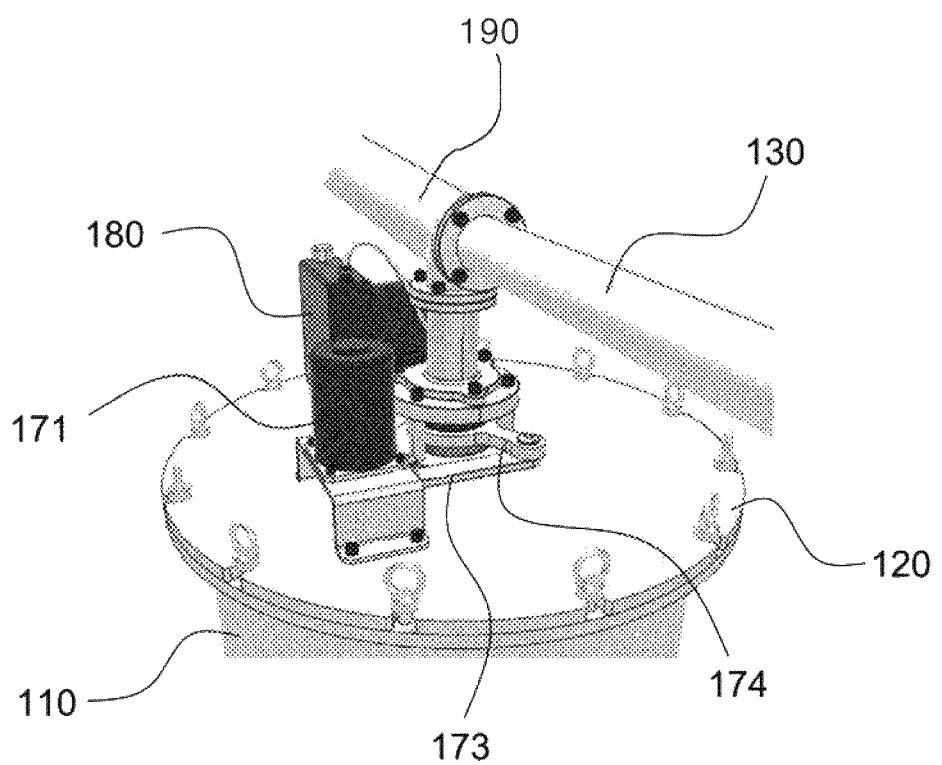
FIG. 14 shows the backwashing water supply unit coupled to the filter rotation unit of the pre-coating filter device in accordance with an embodiment of the invention.

The present invention includes a filtration tank comprising a raw water inlet through which raw water flows on one side, and a drain port at the bottom; a top cover coupled to the upper part of the filtration tank and comprising a coupling hole through the middle part; a purified water discharge pipe coupled to the coupling hole of the top cover; a purified water storage space unit coupled to the lower part of the top cover and located within the filtration tank, and comprising a communication pipe connected to the central part; a filter coupling plate body coupled to the lower part of the purified water storage space unit and comprising a plurality of coupling holes through; and a pre-coating filter coupled to the coupling hole of the filter coupling plate body.

The pre-coating filter device(100) according to the present invention includes a filtration tank(110), a raw water passage part(115), a top cover(120) coupled to the upper part of the filtration tank(110), a purified water discharge pipe(130), a purified water storage space unit(140) coupled to the lower part of the top cover(120), a filter coupling plate body(150) coupled to the lower part of the purified water storage space unit(140), a pre-coating filter(160), a filter rotation unit(170), and a backwashing water supply unit(190).

The filtration tank(110) has a cylindrical shape with an open top, as is known, and comprises a raw water inlet(111) through which raw water flows on one side, and a drain port(112) located at the bottom for discharging water and foreign materials in the filtration tank(110). In addition, a filter medium supply pipe (not shown in the drawing) may be connected to any side of the filtration tank(110) for supplying the filter media into it.

The raw water passage part(115) is located within the filtration tank(110), and connected to the raw water inlet(111) for uniformly supplying raw water to the filtration tank(110). To this end, the raw water passage part(115) comprises a wall distribution tube(116) installed on the inner wall space of the filtration tank(110), and a cross distribution tube(117) cross-connected to the wall distribution tube(116) in a cross shape. On the wall distribution tube(116) and the cross distribution tube(117), a plurality of incision grooves (118) that cut in transverse direction are formed at predetermined intervals.

The top cover(120) is coupled to the upper part of the filtration tank(110) to block the upper part of the filtration tank(110), and comprises a coupling hole(121) through the middle part.

The purified water storage space unit(140) is coupled to the lower part of the top cover(120) and located within the filtration tank(110), and includes the outer side curved toward the lower part to have predetermined space and a communication pipe(141) connected to communicate from the central part to the lower part. The communication pipe(141) is fixedly coupled to the coupling hole(121) of the top cover(120).

The filter coupling plate body(150) is coupled in order to block the lower part of the purified water storage space unit(140), and comprises a plurality of coupling holes(151) through.

The pre-coating filter(160) is coupled to each coupling hole(151) of the filter coupling plate body(150) and located within the filtration tank(110) in a stretched state. In this case, The pre-coating filter(160) may be configured by combining the filter cloth(161) and the elastic body(162). In other words, the filter cloth(161) may have a cylindrical shape with a hollow inside, open top, and blocked bottom, and contain micro pores as a whole. Furthermore, the elastic body(162) may be inserted into the filter cloth(161) so as to be positioned from the lower part to the upper side.

In addition, an outer cap(163) and an inner cap(164) may be further provided in order to couple the pre-coating filter(160) to the filter coupling plate body(150). The outer cap(163) is formed through the central part so as to insert the filter cloth(161) inside and combine it, and includes a screw formed on the outer periphery and an outer locking jaw (163a) formed at the bottom. The inner cap(164) is also formed through the central part, and includes desirably an outer pressing protrusion(164a) on the outer periphery to press the filter cloth(161).

Hence, in the pre-coating filter device(100) according to the present invention, in order to combine the pre-coating filter(160) with the coupling holes(151) of the filter coupling plate body(150), first, the outer cap(163) is screwed together with the coupling holes(151) of the filter coupling plate body(150). The outer cap(163) is rigidly coupled and fixed by hooking the outer locking jaw(163a) to the lower part of the filter coupling plate body(150). Then, the elastic body (162) is inserted into the filter cloth(161), and the upper end of the filter cloth(161) with inserted elastic body(162) is inserted from the lower side of the outer cap(163) to the upper side. When the upper end of the filter cloth(161) spreads to the outside of the outer cap(163) and the inner cap(164) is pressed and inserted into the filter cloth(161), the outer pressing protrusion(164a) of the inner cap(164) firmly holds the filter cloth(161) while applying pressure to the inside of the outer cap(163).

In this case, of course, the order of combining the pre-coating filter(160) may vary according to the situation of the field.

In the pre-coating filter device(100) according to the present invention, the filter rotation unit(170) may be further coupled to the upper side of the top cover(120). The filter rotation unit(170) applies rotational force to the filter coupling plate body(150) and the pre-coating filter(160) so as to detach foreign materials adhered to the pre-coating filter (160) while rotating the filter coupling plate body(150) and the pre-coating filter(160) forward and reverse by a predetermined angle.

To this end, the filter rotation unit(170) is provided with a rotational motor(171) for imparting a rotational force, in which one end of an eccentric shaft(172) is fixedly coupled to the driving shaft of the rotational motor(171) and rotates integrally with the driving shaft of the rotational motor(171). Also, one end of a crank arm(173) hinged to the other end of the eccentric shaft(172) moves in a straight line while being pulled or pushed according to the rotation of the eccentric shaft(172), the other end of the crank arm(173) may be hinged to one end of a core shaft flange(174). The other end of the core shaft flange(174) is coupled to the coupling hole(121) of the top cover(120) and firmly coupled by wrapping the outside of the exposed communication pipe(141) of the purified water storage space unit(140). Accordingly, the purified water storage space unit(140) is rotated forward and reverse by a predetermined angle through the rotation of the rotational motor(171). At this time, it is preferable that the forward and reverse rotational angle is 35~45".

The filtration tank(110) may further comprise a high-pressure injection unit(180) for generating high-pressure air on one side, and a nozzle unit(181) connected to the high-pressure injection unit(180) on the inner wall surface. Hence, the high-pressure washing water or high-pressure air is injected from the high-pressure injection unit(180) to the pre-coating filter(160) through the nozzle unit(181).

In addition, a backwashing water supply unit(190) may be further comprised to supply the high-pressure backwashing water to the inside of the pre-coating filter(160) through the purified water discharge pipe(130). It serves to detach the filter media and foreign materials adhered to the outside of the pre-coating filter(160) by supplying the high-pressure backwashing water to the inside of the pre-coating filter(160) and allowing the high pressure to be discharged to the outside of the filter cloth(161).

The pre-coating filter device(100) of the present invention configured as described above first in order to filter the raw water, fills the inside of the filtration tank(110) with the water in which the filter media of fine particles having micro pores are diluted, or performs the dilution process by supplying the filter media to the filtration tank(110) filled with ordinary water. Then, the water is supplied through the raw water inlet(111) by operating the separate high-pressure pump coupled to the purified water discharge pipe(130). As the water filled in the filtration tank(110) is discharged toward the purified water discharge pipe(130) at high pressure, the filter media diluted in the filtration tank(110) are attached to the outside of the pre-coating filter(160) to make coating on it.

At this time, the water flowing into the filtration tank(110) through the raw water inlet(111) is distributed to the wall distribution tube(116) and the cross distribution tube(117) included in the raw water passage part(115). Then, as through a plurality of incision grooves(118) formed on the wall distribution tube(116) and the cross distribution tube(117), the water evenly sprayed and spread inside the filtration tank(110), the filter medial are evenly attached to the pre-coating filter(160).

After completing the coating process of the filter media on the outside of the pre-coating filter(160), the raw water to be filtered is supplied into the filtration tank(110) through the raw water inlet(111) at high pressure. The supplied raw water is discharged to the purified water discharge pipe(130) through the micro pores formed on each pre-coating filter (160), and then a filtration process for filtering out fine foreign materials is accomplished while passing through the filter media having micro pores coated on the outside of the pre-coating filter(160).

The purified water from which foreign materials are filtered by the filtration process is collected in The purified water storage space unit(140) through the inside of each pre-coating filter(160), and discharged to the purified water discharge pipe(130).

On the other hand, although it may be different depending on the state of raw water, when the filtration process proceeds for more than a predetermined time, naturally, the filtration performance will gradually deteriorate as the amount of foreign materials filtered by the filter media increases.

Therefore, in this case, the filtration process is stopped and the backwashing process is performed.

To this end, the supply of the raw water flowing in through the raw water inlet(111) is stopped, and the high-pressure backwashing water is supplied to the pre-coating filter(160) through the purified water discharge pipe(130) by operating the high-pressure pump provided on the backwashing water supply unit(190) side. That is, the filter media and foreign materials adhered to the outside of the filter cloth(161) are detached instantaneously while the high-pressure backwashing water supplied into the filter cloth(161) is discharged to the outside of the filter cloth(161).

Also, separately from the backwashing water supply of the backwashing water supply unit(190), or together with the backwashing water supply, it is possible to operate the filter rotation unit(170). That is, the eccentric shaft(172) is integrally rotated by rotating the driving shaft of the rotational motor(171). As the eccentric shaft(172) is rotated, the crank arm(173) hinged to it is pulled by a predetermined distance, and simultaneously, the core shaft flange(174) hinged to one end of the crank arm(173) is also pulled by the working distance of the crank arm(173). Hence, the communication pipe(141) of the purified water storage space unit(140) is integrally rotated by the working distance of the core shaft flange(174) at a predetermined angle while the core shaft flange(174) is pulled, and by rotation of the communication pipe(141), the purified water storage space unit(140), the filter coupling plate body(150), and the pre-coating filter(160) are rotated at a predetermined angle.

By the continuous rotation of the driving shaft and the eccentric shaft(172), while pushing back the crank arm(173) that was pulled by a predetermined distance, the core shaft flange(174) is also pushed by a predetermined distance, and the communication pipe(141) is rotated in the opposite direction according to the operation of the core shaft flange (174). Hence, by rotation of the communication pipe(141), the purified water storage space unit(140), the filter coupling plate body(150), and the pre-coating filter(160) are rotated in the opposite direction at a predetermined angle.

As the purified water storage space unit(140) is rotated forward and reverse at high speed in this way, the pre-coating filter(160) elongated downwards is freely shaken, and by shaking the filer cloth(161) together with high-pressure backwashing water discharge, it effectively detaches filter media and foreign materials adhered to the outside of the filter cloth(161) and improves its effect. Also, by causing the shaking filter cloth(161) to collide with each other to generate an impact, it effectively detaches filter media and foreign materials adhered to the outside of the filter cloth(161) and improves its effect.

In addition, after detaching filter media and foreign materials on the outside of the filter cloth(161) to some extent in the backwashing process, the water inside the filtration tank(110) is discharged. Then, by injecting the high-pressure washing water or air through the nozzle unit(181) with the operation of the high-pressure injection unit(180), the filter media and foreign materials remaining on the outside of the filter cloth(161) of the pre-coating filter(160) without be detached are removed and cleaned thoroughly.

As described above, the pre-coating filter device of the present invention improves the filtration efficiency through the filtration process by a plurality of pre-coating filters (160), as well as enhances the detaching effect of the filter media and foreign materials by the high-pressure backwashing water supply of the backwashing water supply unit(190) and shaking of the filter rotation unit(170).

The invention claimed is:

1. A pre-coating filter device comprising:
   a filtration tank comprising a raw water inlet through which raw water flows on one side, and a drain port at the bottom;
   a top cover coupled to the upper part of the filtration tank and comprising a coupling hole through the middle part;
   a purified water discharge pipe coupled to the coupling hole of the top cover;
   a purified water storage space unit coupled to the lower part of the top cover and located within the filtration tank, and comprising a communication pipe connected to the central part;
   a filter coupling plate body coupled to the lower part of the purified water storage space unit and comprising a plurality of coupling holes through;
   a pre-coating filter coupled to the coupling hole of the filter coupling plate body; and
   a filter rotation unit for detaching foreign materials adhered to the pre-coating filter by applying a rotational force to the filter coupling plate body and shaking the pre-coating filter
   wherein the filter rotation unit comprises:
   a rotational motor,
   an eccentric shaft including one side coupled to a driving shaft of the rotational motor and rotating integrally with it,
   a crank arm hinged to the other side of the eccentric shaft and moving in a straight line, and
   a core shaft flange including one side hinged to the other side of the crank arm and the other side coupled to the communication pipe of the purified water storage space unit so as to rotate the purified water storage space unit forward and reverse by a predetermined angle.

2. The pre-coating filter device of claim 1, wherein the filter rotation unit applies the rotational force to rotate the pre-coating filter forward and reverse.

3. The pre-coating filter device of claim 1, wherein the purified water storage space unit is rotated forward and reverse by an angle of 35~45'.

4. The pre-coating filter device of claim 1, wherein the pre-coating filter comprises:
   a filter cloth having a cylindrical shape with a hollow inside, open top, and blocked bottom,
   an elastic body inserted and coupled to the inside of the filter cloth,
   a lower stopper part located at the bottom and formed through the central part so as to be fitted on the upper part of the filter cloth, and
   an upper coupling part located at the top and including a screw formed on the outside to be screwed together with the filter coupling plate body.

5. The pre-coating filter device of claim 1, further comprising:
   a raw water passage part located within the filtration tank and connected to the raw water inlet for uniformly supplying raw water to the inside of the filtration tank.

6. The pre-coating filter device of claim 5, wherein the raw water passage part comprises a wall distribution tube installed on the inner wall of the filtration tank in a ring shape and connected to the raw water inlet, and a cross distribution tube cross-connected to the wall distribution tube in a cross shape, where on the wall distribution tube and the cross distribution tube, there are incision grooves cut and formed in transverse direction for uniformly supplying raw water from the raw water inlet to the inside of the filtration tank.

7. The pre-coating filter device of claim 1, wherein the filtration tank further comprises a high-pressure injection unit on one side and a nozzle unit on the inner wall, where the high-pressure washing water or air is injected from the high-pressure injection unit to the pre-coating filter through the nozzle unit.

8. The pre-coating filter device of claim 7, wherein the nozzle unit is formed of a buoyancy material to move up and down according to the water level inside the filtration tank, and the high-pressure injection unit and the nozzle unit are connected by soft connecting part.

9. The pre-coating filter device of claim 4, wherein a backwashing water supply unit is further comprised in the purified water discharge pipe, where the backwashing water supply unit serves to detach the filter media and foreign materials adhered to the outside of the filter cloth by P supplying high-pressure backwashing water to the inside of the filter cloth.

* * * * *